United States Patent [19]
Frerejacques

[11] Patent Number: 4,861,210
[45] Date of Patent: Aug. 29, 1989

[54] THREADED ELEMENT FORMING FOR EXAMPLE A SCREW, AND ASSEMBLY OF PIECES OBTAINED WITH THE AID OF THIS ELEMENT

[75] Inventor: Jean-Claude Frerejacques, Saint-Cosme-en-Vairais, France

[73] Assignee: Simmonds S.A., Suresnes Cedes, France

[21] Appl. No.: 285,036

[22] Filed: Dec. 16, 1988

[30] Foreign Application Priority Data

Dec. 18, 1987 [FR] France ................... 87 17774

[51] Int. Cl.$^4$ .................. F16B 35/04; B25G 3/00; F16L 25/00
[52] U.S. Cl. ................... 411/411; 411/423; 403/307; 285/334
[58] Field of Search ................ 411/411–416, 411/423, 311, 392; 285/334, 390; 403/306, 307

[56] References Cited

U.S. PATENT DOCUMENTS

| 3,040,327 | 8/1962 | Otaki. | |
| 3,433,117 | 3/1969 | Gowen, Jr. et al. | |
| 3,455,587 | 7/1969 | Gallois. | |
| 4,549,754 | 10/1985 | Saunders et al. | |
| 4,799,844 | 1/1989 | Chuang | 411/423 |

FOREIGN PATENT DOCUMENTS 1952617 12/1966 Fed. Rep. of Germany.

OTHER PUBLICATIONS

French Search Report FR 8717774.

Primary Examiner—Neill R. Wilson
Attorney, Agent, or Firm—Kenyon & Kenyon

[57] ABSTRACT

The present invention relates to an improved threaded element forming for example a screw, which comprises a thread (F) whose bottom (3) comprises two arcs of a circle (4) with equal radii ($r_1$) which are connected tangentially with the sides (2) of thread (F) and one central arc of a circle (5) with a larger radius ($r_2$), and which is connected tangentially with the two arcs of a circle (4).

8 Claims, 1 Drawing Sheet

U.S. Patent    Aug. 29, 1989    4,861,210
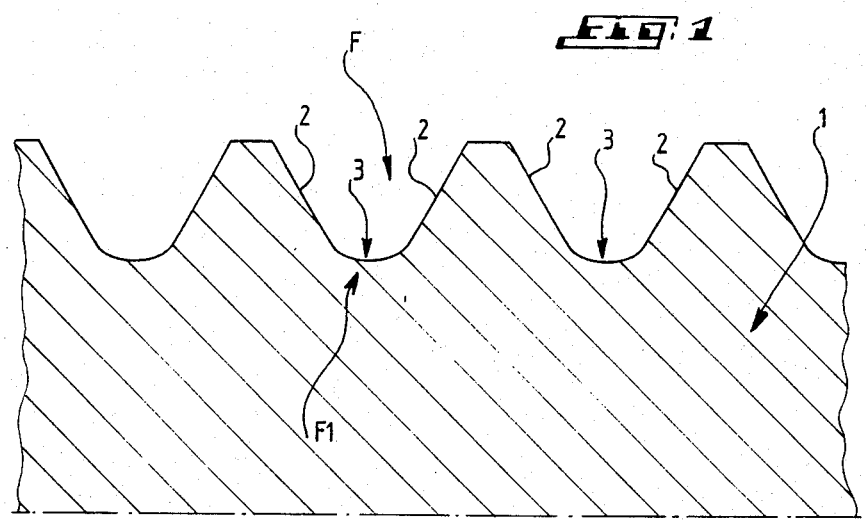
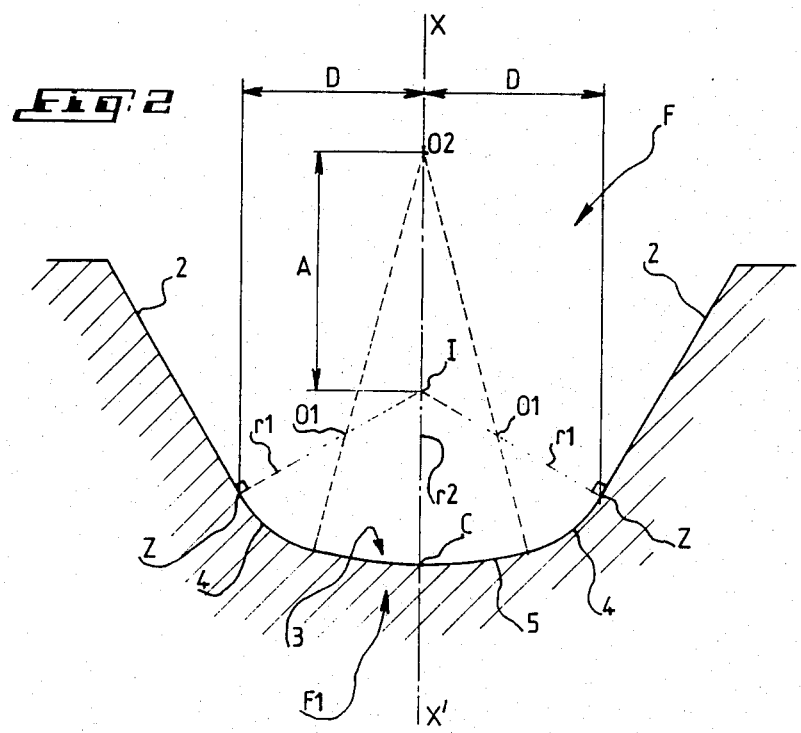

THREADED ELEMENT FORMING FOR EXAMPLE A SCREW, AND ASSEMBLY OF PIECES OBTAINED WITH THE AID OF THIS ELEMENT

BACKGROUND OF THE INVENTION

The present invention relates essentially to an improved threaded element, such as for example a male threaded element forming a screw.

It relates also to an assembly of any parts, obtained with the aid of such a threaded element.

It has been known for a long time that an helical thread comprises a bottom which presents, in cross-section along a plane containing the axis of the threaded element, a rounded shape which is connected tangentially with the sides of the thread.

Now, in an assembly obtained with the aid of such threaded elements, stresses appear after a certain time or when the assembly is stressed by outer forces, which stresses are located in the threaded element at the rounded bottom of the thread. Such stresses are of course prejudicial to the safety of the assembly and may even provoke ruptures of the threaded element and thus the separation of the assembled pieces.

SUMMARY OF THE INVENTION

The present invention has for an object to meet these drawbacks by providing a threaded element whose bottom of the helical thread is such that the maximal stress at the bottom of the thread is considerably reduced, which permits increasing the duration of use or the load of the assemblies, and which at the same time improves substantially the desired safety thereof.

To this end, the invention relates to a threaded element, such as for example a male threaded element forming a screw, comprising at least one helical thread whose bottom presents, in cross-section along a plane containing the axis of the threaded element, a rounded shape which is connected tangentially with the sides of the thread, characterized in that the bottom of the thread, seen from the said section, comprises at least three arcs of a circle which are connected tangentially with one another and with the sides of the thread.

According to a preferred embodiment of the invention, the three aforesaid arcs of a circle comprise two arcs of a circle with equal radii which are connected tangentially with the sides of the thread and one central arc of a circle with a different radius, which is connected tangentially with the two arcs of a circle having equal radii.

The radius of the two arcs of a circle with equal radii is equal to $0.095 \times$ the pitch of the thread of the threaded element, each of these two arcs of a circle comprising a point of connection with the sides of the thread whose distance to the axis of symmetry of the threaded element is equal to 0.156 times the pitch of the thread, whereas the centres of these two arcs of a circle with equal radii are located on a straight line perpendicular to the side of the thread at the aforesaid point of connection, the radii of the two arcs of a circle being defined by the distance between their aforesaid centres and the said point of connection.

According to another feature of the invention, the central arc of a circle which is connected tangentially with the two aforesaid arcs of a circle wih equal radii, possesses a centre located on the axis of symmetry of the thread at a distance equal to 1.56 times the radius of the two arcs of a circle with equal radii, this distance being counted from the intersection of these radii with the said axis of symmetry.

The particular shape of the bottom of the thread of the threaded element according to this invention results advantageously in a reduction of the stresses which is higher than 10%.

BRIEF DESCRIPTION OF THE DRAWINGS

Other advantages and features of the invention will appear more clearly in the following detailed description with reference to the appended drawings, given by way of example only, and wherein:

FIG. 1 is a partial axial cross-sectional half view of a threaded element according to this invention; and FIG. 2 is a large scale cross-sectional view of a thread along a plane containing the axis of the threaded element.

DETAILED DESCRIPTION

Referring to FIGS. 1 and 2, a threaded element 1 is seen which can for example be in the shape of a screw, and which comprises an helical thread F comprising sides 2 with which is tangentially connected a rounded part 3 forming the bottom of thread F.

According to the invention and as appears more clearly in FIG. 2, the bottom 3 of the thread comprises three arcs of a circle, namely two arcs of a circle 4 with equal radii which are connected tangentially with the sides 2 of the thread, and one central arc of a circle with a different radius and which is connected tangentially with the two arcs of a circle 4 with equal radii.

The centres of the arcs of a circle 4 are shown at $O_1$, which centres are located on a straight line perpendicular to the side 2 of the thread, at the point of connection Z of the arcs of a circle 4 with the sides 2. Therefore, the radius $r_1$ is defined by the distance $O_1Z$.

Besides, the distance D from the point of connection Z to the axis of symmetry X-X' of the thread will be equal to 0.156 times the pitch of the thread, the radius $r_1$ of the two arcs of a circle 4 having a length such that $r_1 = 0.095$ times the pitch of the thread.

The centre of the central arc of a circle 5 is shown at $O_2$ in FIG. 2, which centre is located on the axis of symmetry X-X' of thread F at a distance A such that $A = 1.57\ r_1$ counted from the intersection I of both radii $r_1$ with the said axis of symmetry X-X'. The radius of the central arc of a circle 5 is shown at $r_2$ in FIG. 2, which radius is defined by the distance $O_2C$.

It is therefore understood that with all the above data, the arcs of a circle 4 and 5 forming the bottom of thread F can be defined, and this for different values of the pitch.

Thus, for example, for a pitch of 1 mm, $r_1 = 0.095$ mm and $r_2 = 0.301$ mm.

Also, for a pitch of 1,5 mm, $r_1 = 0.142$ mm and $r_2 = 0.451$ mm.

Owing to this particular configuration with three arcs of a circle forming the bottom of the thread, one can obtain a decrease of 11% of the maximal stress in the part $F_1$ of the bottom of the thread, this stress being referred to as the Von Mises' stress.

Therefore, according to the invention an optimal thread profile has been obtained owing to three arcs of a circle forming the bottom of the thread and such as defined above, so as to substantially reduce the rate of the stresses in the treaded element at the thread.

Of course, the invention is by no means limited to the embodiment disclosed and illustrated which has been given by way of example only.

On the contrary, the invention encompasses all the technical equivalents of the means disclosed as well as their combinations, provided that these are carried out according to the spirit thereof.

What is claimed is:

1. A threaded element, such as for example a male threaded element forming a screw, comprising at least one helical thread whose bottom presents, in cross-section along a plane containing the axis of the threaded element, a rounded shape which is connected tangentially with the sides of the thread, wherein the bottom of the thread, seen from the said section, comprises at least three arcs of a circle which are connected tangentially with one another and with the sides of the thread.

2. A threaded element according to claim 1, wherein the three aforesaid arcs of a circle comprise two arcs of a circle with equal radii which are connected tangentially with the sides of the thread and one central arc of a circle with a different radius which is connected tangentially with the two arcs of a circle having equal radii.

3. A threaded element according to claim 2, wherein the two arcs of a circle have a first radius with the first radius=0.095 times the pitch of the thread of the threaded element, each of these two arcs of a circle comprising a point of connection with the side of the thread whose distance to the axis of symmetry of the thread is equal to 0.156 times the pitch of the thread, whereas the centres of the arcs of a circle with a radius are located on a straight line perpendicular to the side of the thread at the point of connection, the said radius being defined by the distance.

4. A threaded element according to claim 2, wherein the central arc of a circle with a radius which is connected tangentially with the two arcs of a circle with a radius possesses a centre located on the axis of symmetry of the thread at a predetermined distance from the intersection of both radii with the said axis of symmetry, the distance being equal to 1.57 times the first radius.

5. A threaded element, the threaded element comprising a helical thread having opposed flanks connected to one another by a root, the root of the helical thread comprising three arcs of a circle, the arcs being connected tangentially with one another and with the opposed flanks.

6. The helical thread of claim 5 wherein the three arcs comprise a central arc having a predetermined radius and two identical connecting arcs extending between the central arc and one of the opposed flanks and wherein the radius of the central arc is larger than the radius of the identical connecting arcs.

7. The threaded element of claim 6 wherein the radius of the central arc is at least three times as great as the radius of the identical connecting arcs.

8. A substantially symmetrical screw thread system including external threads, each profiled to have a flank angle and a predetermined pitch and a central curved root portion having a predetermined radius, the curved root portion being connected to opposing flanks through arcs of a radius 0.095 times the predetermined pitch and less than one third the radius of the central curved root portion.

* * * * *